US010091709B2

(12) United States Patent
Yang et al.

(10) Patent No.: US 10,091,709 B2
(45) Date of Patent: Oct. 2, 2018

(54) PRIORITIZED SYNCHRONIZATION SIGNALS AND MECHANISM FOR DISTRIBUTED DEVICE-TO-DEVICE SYSTEMS

(71) Applicant: Intel IP Corporation, Santa Clara, CA (US)

(72) Inventors: Rongzhen Yang, Shanghai (CN); Huaning Niu, Milpitas, CA (US); Hujun Yin, Saratoga, CA (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 124 days.

(21) Appl. No.: 14/779,559

(22) PCT Filed: Dec. 20, 2013

(86) PCT No.: PCT/US2013/077228
§ 371 (c)(1),
(2) Date: Sep. 23, 2015

(87) PCT Pub. No.: WO2014/182342
PCT Pub. Date: Nov. 13, 2014

(65) Prior Publication Data
US 2016/0037466 A1  Feb. 4, 2016

Related U.S. Application Data

(60) Provisional application No. 61/820,021, filed on May 6, 2013.

(51) Int. Cl.
*H04W 56/00* (2009.01)
*H04W 48/14* (2009.01)
(Continued)

(52) U.S. Cl.
CPC ........... *H04W 48/14* (2013.01); *H04W 4/025* (2013.01); *H04W 4/90* (2018.02); *H04W 8/005* (2013.01);
(Continued)

(58) Field of Classification Search
None
See application file for complete search history.

(56) References Cited

U.S. PATENT DOCUMENTS 7,729,336 B2  6/2010  Pun et al.
8,300,673 B2  10/2012  Hekmann et al.
(Continued)

FOREIGN PATENT DOCUMENTS

WO  WO 2010/047569 A2  4/2010

OTHER PUBLICATIONS

International Search Report and Written Opinion dated Apr. 22, 2014 from International Application No. PCT/US2013/077228.
(Continued)

*Primary Examiner* — Kouroush Mohebbi
(74) *Attorney, Agent, or Firm* — Schwabe, Williamson & Wyatt, P.C.

(57) ABSTRACT

Embodiments described herein relate generally to a user equipment ("UE") that is to transmit and receive signals associated with synchronization. The UE may be receive signals associated with synchronization from a plurality of synchronization sources, such as an evolved Node B ("eNB"), a global navigation satellite system ("GNSS"), or another UE. The UE may synchronize to a signal received from a synchronization source based on a priority associated with that synchronization source and/or signal. However, if the UE does not receive any signals associated with synchronization, the UE may generate and transmit a signal that indicates a request for synchronization.

15 Claims, 9 Drawing Sheets

(51) Int. Cl.
  *H04W 48/16*    (2009.01)
  *H04W 48/18*    (2009.01)
  *H04W 8/00*     (2009.01)
  *H04W 4/02*     (2018.01)
  *H04W 8/02*     (2009.01)
  *H04W 36/24*    (2009.01)
  *H04W 48/20*    (2009.01)
  *H04W 4/90*     (2018.01)
  *H04W 84/04*    (2009.01)
  *H04W 84/18*    (2009.01)

(52) U.S. Cl.
  CPC .......... *H04W 8/02* (2013.01); *H04W 36/245* (2013.01); *H04W 48/16* (2013.01); *H04W 48/18* (2013.01); *H04W 48/20* (2013.01); *H04W 56/001* (2013.01); *H04W 84/045* (2013.01); *H04W 84/18* (2013.01)

(56) References Cited

U.S. PATENT DOCUMENTS

| | | |
|---|---|---|
| 2009/0046683 A1 | 2/2009 | Jung et al. |
| 2009/0086764 A1 | 4/2009 | Lee et al. |
| 2009/0116430 A1* | 5/2009 | Bonta ................ H04W 84/18 370/329 |
| 2011/0176483 A1* | 7/2011 | Palanki ............ H04W 56/0015 370/328 |
| 2011/0182280 A1 | 7/2011 | Charbit et al. |
| 2013/0083779 A1 | 4/2013 | Ahn et al. |
| 2013/0086214 A1 | 4/2013 | Jung et al. |

OTHER PUBLICATIONS

ETRI, "Discussion on evaluation methodology for D2D," 3GPP TSG RAN WG1 Meeting #72bis, R1-131140, Agenda Item: 7.2.7, Apr. 15-19, 2013, Chicago, USA, 3 pages.

Office Action dated Aug. 27, 2015 from Taiwan Patent Application No. 103115175.

3GPP, "Technical Specification Group Services and System Aspects; Feasibility study for Proximity Services (ProSe) (Release 12)," 3GPP TR 22.803 V12.0.0 (Dec. 2012), Dec. 18, 2012, 40 pages.

* cited by examiner

PRIORITIZED SYNCHRONIZATION SIGNALS AND MECHANISM FOR DISTRIBUTED DEVICE-TO-DEVICE SYSTEMS

CROSS REFERENCE TO RELATED APPLICATIONS

This application is a national phase entry under 35 U.S.C. § 371 of International Application No. PCT/US2013/077228, filed Dec. 20, 2013, entitled "PRIORITIZED SYNCHRONIZATION SIGNALS AND MECHANISM FOR DISTRIBUTED DEVICETO-DEVICE SYSTEMS", which claims priority under 35 U.S.C. § 119(e) to U.S. Provisional Patent Application No. 61/820,021 entitled "ADVANCED WIRELESS COMMUNICATION SYSTEMS AND TECHNIQUES," filed May 6, 2013, the entire disclosures of which are hereby incorporated by reference in their entireties.

FIELD OF INVENTION

Embodiments of the present invention relate generally to the technical field of data processing, and more particularly, to wireless networks provided to user equipment devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

Wireless communication systems experience increasingly heavier loads with the widespread adoption of smartphones, tablets, mobile hotspots and the like. Device-to-device ("D2D") communication may improve functionality and/or services available at a device by, for example, increasing bandwidth. D2D communication may allow a user equipment ("UE") to communicate directly with a second UE through a direct local link that circumvents an evolved Node B ("eNB") or other base station. Often, two UEs that are to engage in D2D communications may be relatively proximate to one another, allowing for increased data transfer (e.g., high bit rates) that corresponds to decreased power consumption.

To engage in D2D communication, synchronization must be performed across the participating UEs. Synchronization may ensure that one or more UEs participating in a network, such as a radio network, operate according to parameters defined by an appropriate standard (e.g., the 3rd Generation Partners Project standard). For example, using a reference signal, a UE may acquire timing so that operations related to discovery, paging, data exchange, and the like may be performed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
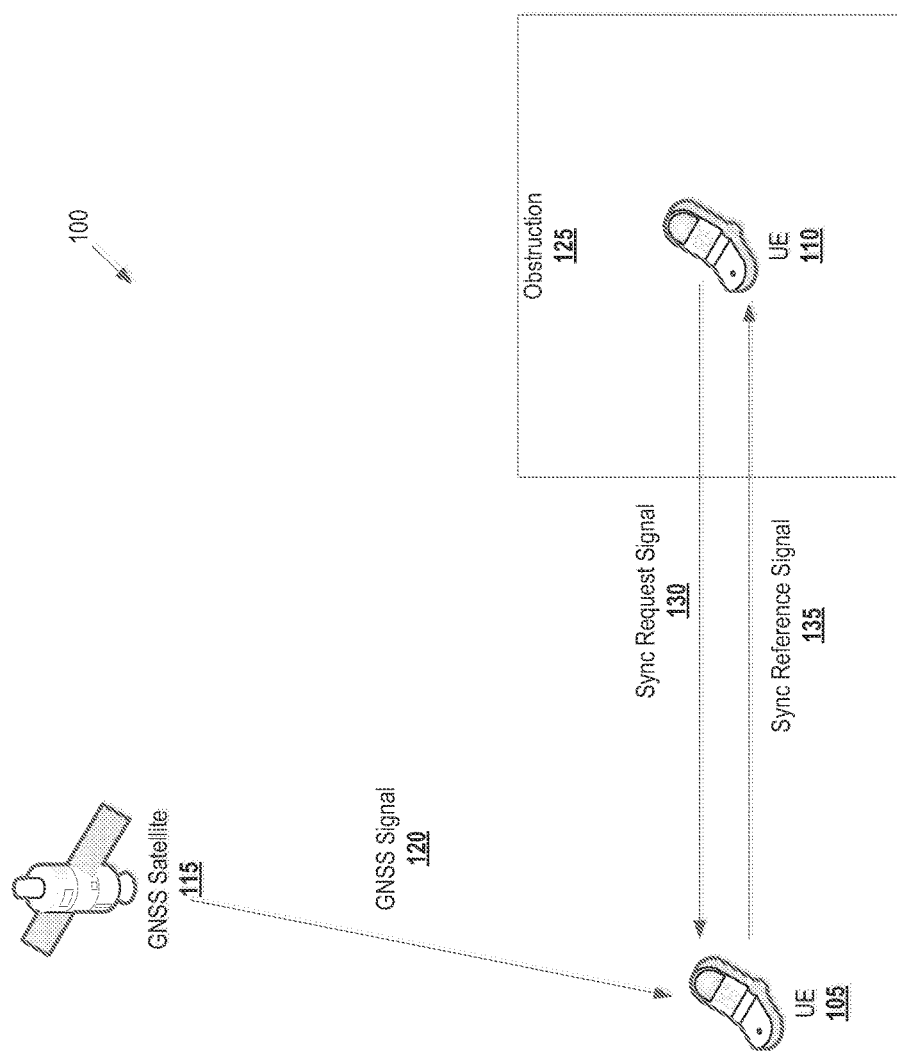
FIG. 1 is an exemplary wireless communication network illustrating a UE that is to receive a signal for synchronization and transmit a signal for synchronization, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

Embodiments described herein relate generally to synchronization signals and how a synchronization reference signal may be selected and propagated in a network. In a D2D system, such as a distributed D2D system, synchronization may be required for three kinds of coverage available from a mobile network operator ("MNO"): full coverage; partial coverage; and no coverage. While at least partial coverage is available from the MNO, a UE may synchronize to an eNB associated with the MNO. This UE may subsequently relay a synchronization signal received from the eNB to another UE that may not be able to receive synchronization signals from the eNB. Advantageously, D2D synchronization may minimize interference in the MNO network.

In various embodiments in which MNO coverage may be partially or completely unavailable, a UE may be adapted to operate on a spectrum that is different than a spectrum reserved for the MNO. For example, public safety UEs may be configured to operate on a spectrum reserved for public safety communication. A UE adapted to operate on a public safety spectrum may synchronize to a signal received from a global navigation satellite service ("GNSS"). The UE may then relay this GNSS synchronization signal to another UE that is unable to synchronize to the GNSS signals.

In various embodiments, a UE may generate a signal to which a second UE may synchronize. In such embodiments, one or both UEs may be unable to synchronize to any of an eNB signal, a GNSS signal, a signal relayed from an eNB, and a signal relayed from a GNSS. Accordingly, a first UE may generate a signal to request synchronization and a second UE may correspondingly synchronize to this synchronization request signal.

Across many of the aforementioned embodiments, a UE may be adapted to synchronize to signals according to their priority. The priority of the signal may be indicated within the signal itself and/or may be resolved by the UE according to, for example, one or more predetermined parameters and/or one or more predetermined algorithms stored in the UE. Thus, where a UE receives a plurality of signals (e.g., from an eNB, relayed from a GNSS, etc.), the UE may be adapted to synchronize to the signal having the highest priority. Further, even where a UE has synchronized to one signal, the UE may continue to scan for other signals to which the UE may synchronize and synchronize to new signals as such new signals are detected through the scanning.

FIG. 1 illustrates an exemplary wireless environment 100, according to one embodiment. The wireless environment 100 may include a plurality of UEs 105, 110 that may be adapted to operate on a wireless network provided by an MNO (not shown). As illustrated herein, the plurality of UEs 105, 110 may be located outside of a coverage area provided by an MNO. According to some embodiments, one or both of the UEs 105, 110 may be adapted for public safety, and therefore may operate using a spectrum reserved for public safety (e.g., a radio spectrum reserved by the Federal Communications Commission).

In various embodiments, one or both of the UEs 105, 110 may be adapted for proximity-based services. With proximity-based services, a first UE (e.g., the first UE 105) may be proximate to a second UE (e.g., the second UE 110), the first and second UEs may be adapted to exchange data with one another. Proximity-based services may facilitate communication between the UEs 105, 110 when MNO coverage is absent. Further, the proximity-based services may be used by one or both UEs 105, 110 for public safety.

In various embodiments, the first UE 105 of the wireless environment 100 may be adapted to determine that a signal associated with MNO coverage, such as a signal provided by an eNB, is absent. The first UE 105 may further be adapted to receive a signal 120 from a synchronization source that is a GNSS satellite 115. Where the first UE 105 is unable to synchronize to a signal provided by an eNB (e.g., where the first UE 105 determines the absence of a signal associated with MNO coverage), the first UE 105 may synchronize to the GNSS signal 120 received from the GNSS satellite 115. While the first UE 105 may synchronize to the GNSS signal 120, the first UE 105 may continue to scan for a signal of a higher priority, such as a signal associated with MNO coverage (e.g., a signal provided by an eNB or forwarded from the eNB by another UE). Where the first UE 105 detects a higher priority signal, the first UE 105 may synchronize to the higher priority signal.

In the wireless environment 100, a second UE 110 may be proximate to the first UE 105. The two UEs 105, 110 may be proximate to one another in the environment 100 such that one or both UEs 105, 110 may engage in proximity-based services with the other UE 105, 110. In various embodiments, however, the second UE 110 may be unable to receive the GNSS signal 120 from the GNSS satellite synchronization source 115. As illustrated, the second UE 110 may be located behind an obstruction 125, which may be, for example, a physical obstruction (e.g., a building or other physical structure which obscures the GNSS signal 120) and/or a conceptual obstruction (e.g., a limitation on the hardware and/or software of the second UE 110). Generally, the obstruction 125 prevents the second UE 110 from receiving and/or decoding the GNSS signal 120 from the GNSS satellite synchronization source 115.

Like the first UE 105 (and potentially as a consequence of the obstruction 125), the second UE 110 may be adapted to determine that a signal associated with MNO coverage, such as a signal provided by an eNB, is absent. In various embodiments, the second UE 110 may be further adapted to determine the absence of a signal forwarded from an eNB. Additionally, the second UE 110 may be adapted to determine the absence of the signal 120 from the GNSS satellite synchronization source 115. Where the second UE 110 is unable to synchronize to a signal provided by an eNB (e.g., where the second UE 110 determines the absence of a signal associated with MNO coverage, the absence of a signal from an eNB forwarded by another UE, and/or the absence of the GNSS signal 120), the second UE 110 may generate a signal 130 that indicates a request for synchronization. Hereinafter, signal 130 may also be referred to as synchronization request signal 130 or sync request signal 130. In various embodiments, this synchronization request signal 130 may be generated by circuitry and/or a crystal oscillator (not shown) included in the second UE 110. According to one embodiment, the synchronization request signal 130 may be transmitted on a spectrum reserved for public safety that may be separate from a spectrum associated with an MNO.

In connection with the synchronization request signal 130, the first UE 105 may transmit a signal 135 that indicates a reference for synchronization. Hereinafter, signal 135 may also be referred to as synchronization reference signal 135 or sync reference signal 135. In one embodiment, the first UE 105 may transmit the synchronization reference signal 135 by relaying the GNSS signal 120. In various embodiments, the first UE 105 may generate the synchronization reference signal 135 using circuitry and/or a crystal oscillator (not shown) included in the first UE 105. Where the first UE 105 generates the synchronization reference signal 135, the first UE 105 may generate the synchronization reference signal 135 based on the received GNSS signal 120 to which the first UE 105 is synchronized. Additionally, the first UE 105 may include information in the synchronization reference signal 135 such as a number of hops and/or an indication of the priority of the signal. According to one embodiment, the synchronization reference signal 135 may be transmitted on a spectrum reserved for public safety that may be separate from a spectrum associated with an MNO.

In various embodiments, the first UE 105 may transmit the synchronization reference signal 135 based on the synchronization request signal 130 (e.g., in response to receiving the synchronization request signal 130). In other embodiments, however, the first UE 105 may transmit the synchronization reference signal 135 without first receiving the synchronization request signal 130 (e.g., based on synchronizing to the GNSS signal 120). The second UE 110 may receive the synchronization reference signal 135 and synchronize to that synchronization reference signal 135. Accordingly, the first UE 105 and the second UE 110 may participate in proximity-based services with one another.

Figure 2:
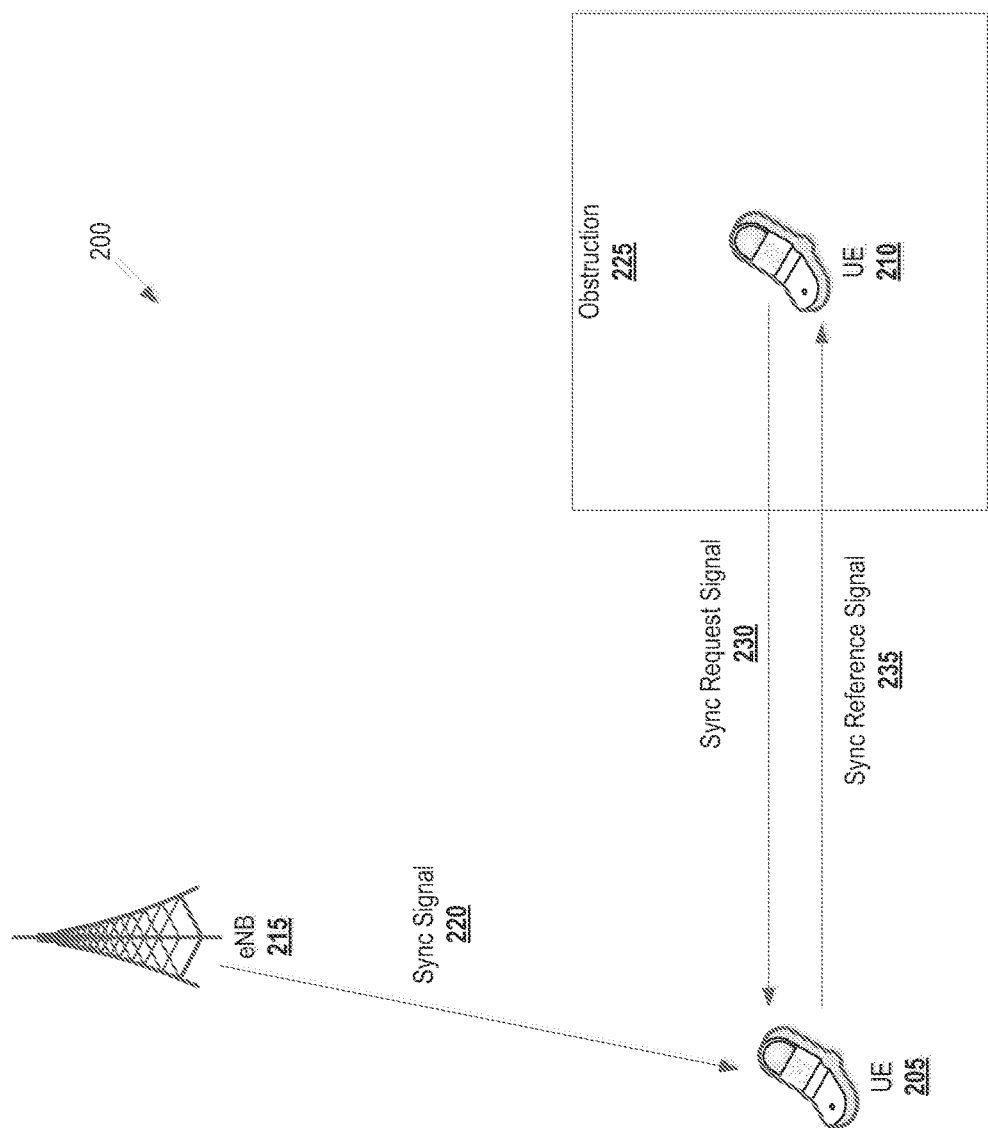
FIG. 2 is an exemplary wireless communication network illustrating a UE that is to receive a signal for synchronization and transmit a signal for synchronization, in accordance with various embodiments.

Turning now to FIG. 2, an exemplary wireless environment 200 is shown illustrating an embodiment for transmitting synchronization signals to which a UE may synchronize. In the context of FIG. 1, the first UE 205 may correspond to the UE 105, the second UE 210 may correspond to the second UE 110, the obstruction 225 may correspond to the obstruction 125, and the synchronization request signal 230 may correspond to the synchronization request signal 130.

In the wireless environment 200, the first UE 205 may be located in an area with coverage provided by an MNO (not shown). As illustrated herein, the MNO coverage may be provided by an eNB 215 that is associated with the MNO and operates as a synchronization source. The eNB 215 may provide a wireless cell (not shown) that is to serve the first UE 205 in the wireless environment 200. To operate on the wireless cell provided by the eNB 215, the first UE 205 may first synchronize to a signal 220 intended for synchronization and provided by the eNB 215.

In various embodiments, the synchronization signal 220 may be a primary synchronization signal ("PSS") or a secondary synchronization signal ("SSS"). The first UE 205 receives the synchronization signal 220 and synchronizes thereto. In various embodiments, the first UE 205 may receive an additional signal (not shown) from the eNB 215, such as a complementary PSS or SSS, and use this additional signal for synchronization as well.

In the wireless environment 200, the second UE 210 may be proximate to the first UE 205. The two UEs 205, 210 may be proximate to one another in the environment 200 such that one or both UEs 205, 210 may engage in proximity-based services with the other UE 205, 210. In various embodiments, however, the second UE 210 may be unable to receive the synchronization signal 220 from the eNB 215 associated with the MNO. As illustrated, the second UE 210 may be located behind an obstruction 225, which may be, for example, a physical obstruction (e.g., a building or other physical structure which obscures the synchronization signal 220) and/or a conceptual obstruction (e.g., a limitation on the hardware and/or software of the second UE 210). Generally, the obstruction 225 prevents the second UE 210 from receiving and/or decoding the synchronization signal 220 from the eNB 215.

Like the first UE 205 (and potentially as a consequence of the obstruction 225), the second UE 210 may be adapted to determine that a signal associated with MNO coverage, such as a signal provided by an eNB, is absent. Where the second UE 210 is unable to synchronize to the synchronization signal 220 provided by the eNB 215, the second UE 210 may generate a signal 230 that indicates a request for synchronization. Hereinafter, the signal 230 may also be referred to as a synchronization request signal 230 or a sync request signal 230. In various embodiments, this synchronization request signal 230 may be generated by circuitry and/or a crystal oscillator (not shown) included in the second UE 210. According to one embodiment, the synchronization request signal 230 may be transmitted on a spectrum reserved for public safety that may be separate from a spectrum associated with an MNO.

In connection with the synchronization request signal 230, the first UE 205 may transmit a signal 235 that indicates a reference for synchronization. Hereinafter, the signal 235 may also be referred to as a synchronization reference signal 235 or a sync reference signal 235. In one embodiment, the first UE 205 may transmit the synchronization reference signal 235 by relaying the synchronization signal 220 which the first UE 205 received from the eNB synchronization source 215. In various embodiments, the first UE 205 may generate the synchronization reference signal 235 using circuitry and/or a crystal oscillator (not shown) included in the first UE 205. Where the first UE 205 generates the synchronization reference signal 235, the first UE 205 may generate the synchronization reference signal 235 based on the received synchronization signal 220 to which the first UE 205 is synchronized. Additionally, the first UE 205 may include information in the synchronization reference signal 235 such as a number of hops and/or an indication of the priority of the signal. According to one embodiment, the synchronization reference signal 235 may be transmitted on a spectrum reserved for public safety that may be separate from a spectrum associated with the MNO (e.g., a spectrum on which the synchronization signal 220 is received).

In various embodiments, the first UE 205 may transmit the synchronization reference signal 235 based on the synchronization request signal 230 (e.g., in response to receiving the synchronization request signal 230). In other embodiments, however, the first UE 205 may transmit the synchronization reference signal 235 without first receiving the synchronization request signal 230 (e.g., based on synchronizing to the synchronization signal 220). The second UE 210 may receive the synchronization reference signal 235 and synchronize to that synchronization reference signal 235. Accordingly, the first UE 205 and the second UE 210 may participate in proximity-based services with one another.

While the second UE 210 may synchronize to the synchronization reference signal 235, the second UE 210 may continue to scan for a signal of a higher priority, such as a signal associated with MNO coverage (e.g., a signal provided by the eNB synchronization source 215). Where the second UE 210 detects a higher priority signal, the second UE 210 may synchronize to the higher priority signal.

Figure 3:
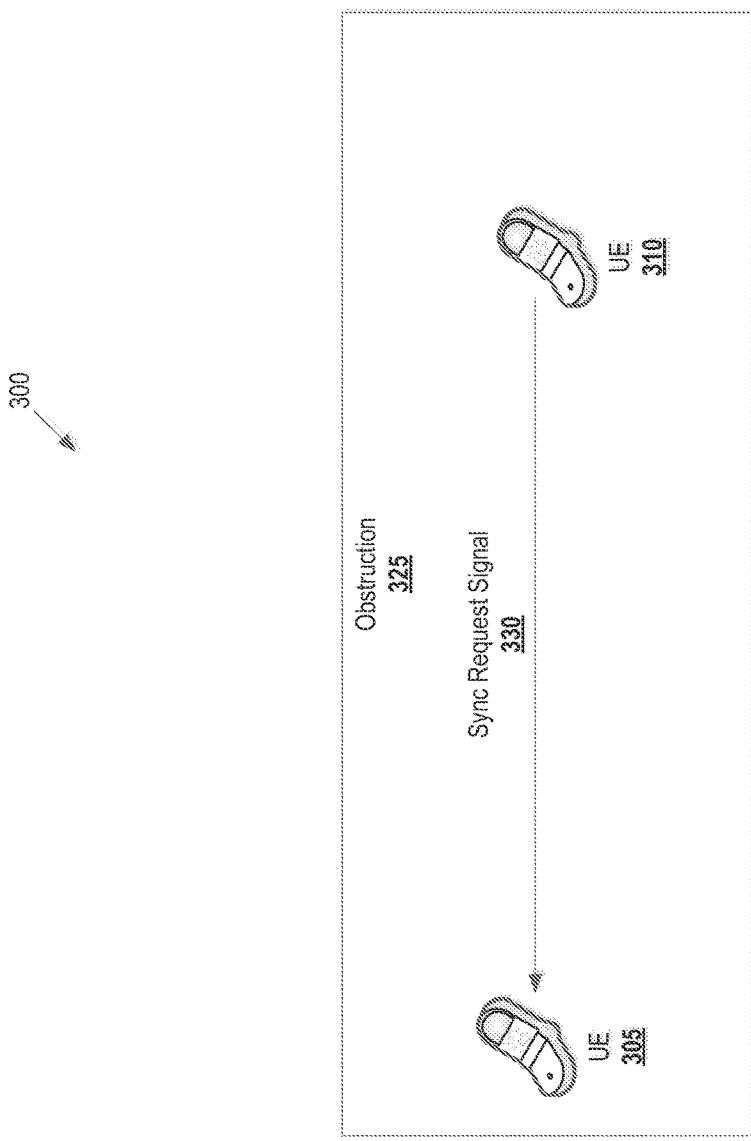
FIG. 3 is an exemplary wireless communication network illustrating a UE that is to receive a signal for synchronization and transmit a signal for synchronization, in accordance with various embodiments.

Now with respect to FIG. 3, an exemplary wireless environment 300 is shown illustrating an embodiment for transmitting synchronization signals to which a UE may synchronize. In the context of FIGS. 1 and 2, the first UE 305 may correspond to the first UE 105 and/or the first UE 205, the second UE 310 may correspond to the second UE 110 and or the second UE 210, the obstruction 325 may correspond to the obstruction 125 and/or the obstruction 225, and the synchronization request signal 330 may correspond to the synchronization request signal 130 and/or the synchronization request signal 230.

The wireless environment 300 features two UEs 305, 310 that are proximate to one another in a geographic area such that one or both UEs 305, 310 may engage in proximity-based services with the other UE 305, 310. In various embodiments, however, both the UEs 305, 310 may be unable to receive synchronization signals that are associated with an MNO, a GNSS, or transmitted by another UE based on a signal received from an MNO or a GNSS. As illustrated, the UEs 305, 310 may be located behind an obstruction 325, which may be, for example, a physical obstruction (e.g., a building or other physical structure which obscures signals from an eNB or a GNSS) and/or a conceptual obstruction (e.g., a limitation on the hardware and/or software of one or both of the UEs 305, 310). Generally, the obstruction 325 prevents both UEs 305, 310 from receiving and/or decoding signals from an eNB or a GNSS. Although illustrated herein as a single obstruction 325, the description herein may be applicable to embodiments wherein each UE is hampered by separate respective obstructions (e.g., the first UE 305 may be obstructed by a hardware/software limitation, whereas the second UE 310 may be located inside a building).

Both the first UE 305 and the second UE 310 may be adapted to determine the absence of a signal associated with MNO coverage (e.g., a signal provided by an eNB) and/or a signal provided by a GNSS (e.g., based on the presence of the obstruction 325). Where both UEs 305, 310 are unable to synchronize to a signal provided by an eNB and/or a signal provided by a GNSS, the second UE 310 may generate a signal 330 that indicates a request for synchronization. In various embodiments, this synchronization request signal 330 may be generated by circuitry and/or a crystal oscillator (not shown) included in the second UE 310. According to one embodiment, the synchronization request signal 330 may be transmitted on a spectrum reserved for public safety that may be separate from a spectrum associated with an MNO.

The first UE 305 may receive the synchronization request signal 330 and synchronize to that synchronization request signal 330. Here, the second UE 310 may be a synchronization source for the first UE 305. Following synchronization to the synchronization request signal 330, the first UE 305 and the second UE 310 may participate in proximity-based services with one another. In various embodiments, the first UE 305 may begin an ad hoc network with the second UE 310.

While the first UE 305 may synchronize to the synchronization request signal 330, the first UE 305 may continue to scan for a signal of a higher priority, such as a signal associated with MNO coverage (e.g., a signal provided by an eNB), a signal provided by a GNSS, and/or a signal relayed by another UE from an eNB or GNSS. Where the first UE 305 detects a higher priority signal, the first UE 305 may synchronize to the higher priority signal. In various embodiments, the first UE 305 may relay this higher priority signal to the second UE 310 so that the second UE 310 may synchronize thereto.

Similarly, the second UE 310 may continue to scan for a signal of a higher priority contemporaneously with transmitting the synchronization request signal 330, such as a signal associated with MNO coverage (e.g., a signal provided by an eNB), a signal provided by a GNSS, and/or a signal relayed by another UE from an eNB or GNSS. Where the second UE 310 detects a higher priority signal, the second UE 310 may synchronize to the higher priority signal. In various embodiments, the second UE 310 may relay this higher priority signal to the first UE 305 so that the first UE 305 may synchronize thereto.

Figure 4:
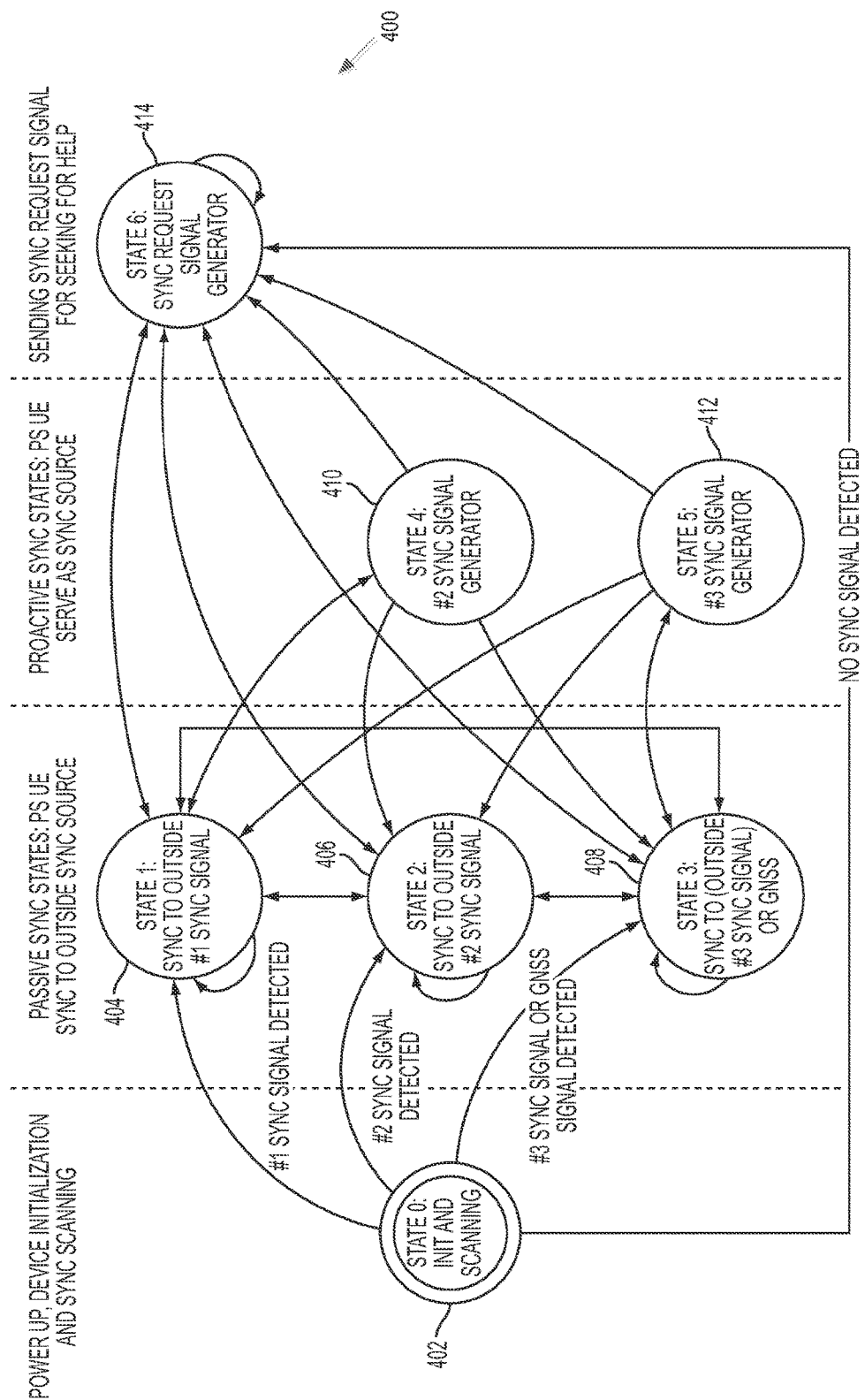
FIG. 4 is a state diagram illustrating the states for a UE that is to transmit and receive signals associated with synchronization, in accordance with various embodiments.

Turning to FIG. 4, a state chart 400 illustrates a plurality of states to which an apparatus to be included in UE may transition during operation, according to various embodiments. The state chart 400 may illustrate a plurality of states for an apparatus that may participate in D2D communication, such as an apparatus to be included in a UE 105, 110 shown in FIG. 1, a UE 205, 210 shown in FIG. 2, and/or a UE 305, 310 shown in FIG. 3.

The apparatus may be adapted to synchronize to a plurality of signals provided by a plurality of sources according to a priority associated with each synchronization signal. The apparatus may have a priority associated with a signal stored therein in data structures and/or the priority of a signal may be included in the signal. In one embodiment, the apparatus associates a first priority with a synchronization signal received from an eNB (e.g., the PSS/SSS). This first-priority synchronization signal may be received from an eNB on a radio spectrum associated with an MNO. This synchronization signal received from an eNB may be legacy signal to which a plurality of UEs (e.g., non-public safety UEs) may synchronize.

The apparatus may be adapted to relay a synchronization signal received from an eNB and may likewise be adapted to receive a synchronization signal relayed by another UE from an eNB. This second signal may have a lower priority than the first signal received from the eNB. In various embodiments, the second-priority signal may be relayed by a public-safety device on a radio spectrum associated with public safety. According to one embodiment, the second-priority signal may only be relayed by one device (e.g., a UE)—that is, the second signal should be associated with a maximum of one hop when received at the apparatus.

When coverage from an MNO is not available, the apparatus may be adapted to synchronize to a signal a GNSS, either by receiving a signal from a GNSS satellite or from a UE that relays a signal from a GNSS satellite. This third-priority signal, associated with a GNSS, may have a lower priority than both a signal received from an eNB and a signal relayed by a device (e.g., a UE). Where the third-priority signal is relayed by a device, the third-priority signal may be relayed on a radio spectrum associated with public safety. According to one embodiment, the third-priority signal may only be relayed by one device (e.g., a UE)—that is, the third-priority signal should be associated with a maximum of one hop when received at the apparatus.

Based on the priorities associated with the signals, the apparatus may follow a predetermined scheme for performing synchronization. Where a first-priority signal from an eNB is available, the apparatus may synchronize to the first signal instead of synchronizing to other signals. Where a second-priority signal relayed from an eNB by a device (e.g., a UE) is available but a first-priority signal is not, the apparatus may synchronize to the second signal instead of synchronizing to other signals. Where a second-priority signal relayed from an eNB by a device (e.g., a UE) is available but a first-priority signal is not, the apparatus may synchronize to the second-priority signal instead of synchronizing to other signals. Where the first- and second-priority signals are not available, the apparatus may be able to detect the third-priority signal from a GNSS (e.g., where the UE in which the apparatus is included is located outside).

If the apparatus is unable to detect any of the first-, second-, and third-priority signals (e.g., where the UE in which the apparatus is included is obstructed), then the apparatus may generate a synchronization request signal. The apparatus may generate the synchronization request signal until at least one of the three signals is detected (thereby allowing the apparatus to synchronize to a source). In one embodiment, the apparatus may detect a synchronization request signal from a second UE that is similarly unable to receive one of the first, second, and third signals. The apparatus may synchronize to this received synchronization request and subsequently start an ad hoc network.

In various embodiments, the apparatus may generate and/or relay a signal to which a second UE may synchronize. For example, the apparatus may generate a synchronization signal based on the first signal received from an eNB. This generated signal would then be received as the second signal by the second UE. Alternatively, the apparatus may generate a synchronization signal based on the third signal received from a GNSS. This generated signal would then be received as the third signal by the second UE.

In state 0, an apparatus may be initialized so that the apparatus begins scanning for synchronization signal (block 402). State 0 may be reached, for example, when the apparatus is powered on, when no synchronization has yet occurred, or when a link has failed so that the apparatus is no longer synchronized to a signal. If at least one of the first-, second-, and third-priority signals is detected, the apparatus may transition to one of three passive synchronization states. If the first-priority signal is detected during scanning, the apparatus may transition to state 1 (block 404). If the first-priority signal is not detected but the second-priority signal is detected during scanning, the apparatus may transition to state 2 (block 406). If the first-priority and second-priority signals are not detected during scanning but the third-priority signal is detected during scanning, the apparatus may transition to state (3) (block 408). If none of the first-, second-, and third-priority signals are detected, the apparatus may transition to state 6 (block 414).

In state 1, the apparatus may be synchronized to the first-priority signal (block 402). Here, the apparatus may scan for additional external signals, even where no signals have a higher priority than the first-priority signal (e.g., to periodically confirm that the first-priority signal is still detectable). The apparatus may be adapted to remain in state 1 while the first-priority signal is detected and no synchronization request signal is received. Where, however, the first-priority signal is still detected and a synchronization request signal is received, the apparatus may transition to state 4 (block 410).

While at state 1, the apparatus may by subsequently unable to detect the first-priority signal. If, however, the second-priority signal is detected then the apparatus may transition to state 2 (block 406). If the apparatus is unable to detect the second-priority signal, the apparatus may transition from state 1 to state 3 (block 408). If none of the first-, second-, and third-priority synchronization signals are available, then the apparatus may transition to state 6 (block 414).

In state 2, the apparatus may be synchronized to the second-priority signal (block 404). Here, the apparatus may scan for additional external signals, such as by polling for a higher-priority signal and/or confirming the availability of the second-priority signal. The apparatus may be adapted to remain in state 2 while the second-priority signal is detected and the first-priority signal is not detected.

If the first-priority signal is detected while the apparatus is in state 2 then the apparatus may transition to state 1 (block 406). While at state 2, the apparatus may by subsequently unable to detect the second-priority signal. If the apparatus is unable to detect the second-priority signal, the apparatus may transition from state 2 to state 3 (block 408). If none of the first-, second-, and third-priority synchronization signals are available, then the apparatus may transition to state 6 (block 414).

In state 3, the apparatus may be synchronized to the third-priority signal (block 404). Here, the apparatus may scan for additional external signals, such as by polling for a higher-priority signal and/or confirming the availability of the third-priority signal. The apparatus may be adapted to remain in state 3 while the third-priority signal is detected and the first- and second-priority signals are not detected, and no synchronization request signal is detected. Where the apparatus receives a synchronization request signal while in state 3, the apparatus may transition to state 5 (block 412).

If the first-priority signal is detected while the apparatus is in state 3 then the apparatus may transition to state 1 (block 402). Similarly, if the second-priority signal is detected while the apparatus is in state 3 then the apparatus may transition to state 2 (block 404). While at state 3, the apparatus may by subsequently unable to detect the third-priority signal. If none of the first-, second-, and third-priority synchronization signals are available, then the apparatus may transition to state 6 (block 414).

From a passive synchronization state, the apparatus may be adapted to transition to one of two proactive synchronization states. In a proactive synchronization state, the apparatus may serve as a synchronization source for another UE. While in a proactive synchronization state, the apparatus may continue to passively receive a synchronization signal, similar to states 1-3 (blocks 404-408).

From state 1, the apparatus may transition to state 4 where the first-priority signal (i.e., a signal from an eNB) is received and a synchronization request signal is received (e.g., a synchronization request signal from another UE) (block 410). At state 4, the apparatus may generate the second-priority signal for another UE, such as by relaying the first-priority signal from an eNB. According to one embodiment, the apparatus may generate the second-priority signal during a predetermined period. This predetermined period may be defined by a countdown timer (e.g., ten minutes). At the end of the predetermined period (e.g., the expiry of the countdown timer), the apparatus may scan the signals to determine what signals are being received.

If the apparatus is able to detect the first-priority signal but the apparatus no longer detects the synchronization request signal, then the apparatus may return to state 1. However, if both the first-priority signal and the synchronization request signal are detected by the apparatus, then the apparatus will remain in state 4. If the apparatus is unable to detect the first-priority signal but detects a second-priority signal from another UE, the apparatus may transition to state 2. If the apparatus is unable to detect the first- and second-priority signals but detects a third-priority signal (e.g., from a GNSS or from another UE relaying a GNSS signal), the apparatus may transition to state 3. If the apparatus is unable to detect any signals to which the apparatus may synchronize, the apparatus may transition to state 6 to generate a synchronization request signal.

From state 3, the apparatus may transition to state 5 where the third-priority signal (i.e., a signal from a GNSS) is received and a synchronization request signal is received (e.g., a synchronization request signal from another UE) (block 412). At state 5, the apparatus may generate the third-priority signal for another UE, such as by relaying the third-priority signal from a GNSS. According to one embodiment, the apparatus may generate the third-priority signal during a predetermined period. This predetermined period may be defined by a countdown timer (e.g., ten seconds). At the end of the predetermined period (e.g., the expiry of the countdown timer), the apparatus may scan to determine what signals are being received.

If the apparatus is able to detect the first- or second-priority signals then the apparatus may transition to state 1 or state 2, respectively. However, if the first- and second-priority signals are not detected but a third-priority signal from a GNSS and the synchronization request signal are detected by the apparatus, then the apparatus will remain in state 5. If the apparatus is unable to detect the first-priority signal but detects a second-priority signal from another UE, the apparatus may transition to state 2. If the apparatus is unable to detect the first- and second-priority signals and a synchronization request signal but detects a third-priority signal (e.g., from a GNSS or from another UE relaying a GNSS signal), the apparatus may transition to state 3. If the apparatus is unable to detect any signals to which the apparatus may synchronize, the apparatus may transition to state 6 to generate a synchronization request signal.

From any of the aforementioned states, the apparatus may transition to state 6. At state 6, the apparatus may generate a synchronization request signal to request a signal to which the apparatus may synchronize. Other devices (e.g., public safety UEs) may synchronize to this synchronization request signal, such as devices that are likewise unable to receive the first-, second-, and third-priority signals. In various embodiments, the apparatus may receive one or more synchronization request signals from one or more other devices (e.g., public safety UEs) and the apparatus may generate the synchronization request signal based on an average of the frequencies and an average of the symbol boundaries of the one or more received synchronization request signals. A synchronization request signal therefore may be used to synchronize an ad hoc network in a distributed fashion.

According to one embodiment, the apparatus may generate the synchronization request signal during a predetermined period. This predetermined period may be defined by a countdown timer (e.g., ten seconds). At the end of the predetermined period (e.g., the expiry of the countdown timer), the apparatus may scan to determine what signals are being received. If the apparatus is able to detect the first-, second-, or third-priority signals, then the apparatus may transition to state 1, state 2, or state 3, respectively. However, if the first-, second-, or third-priority signals are not detected by the apparatus, then the apparatus may remain in state 6.

Figure 5:
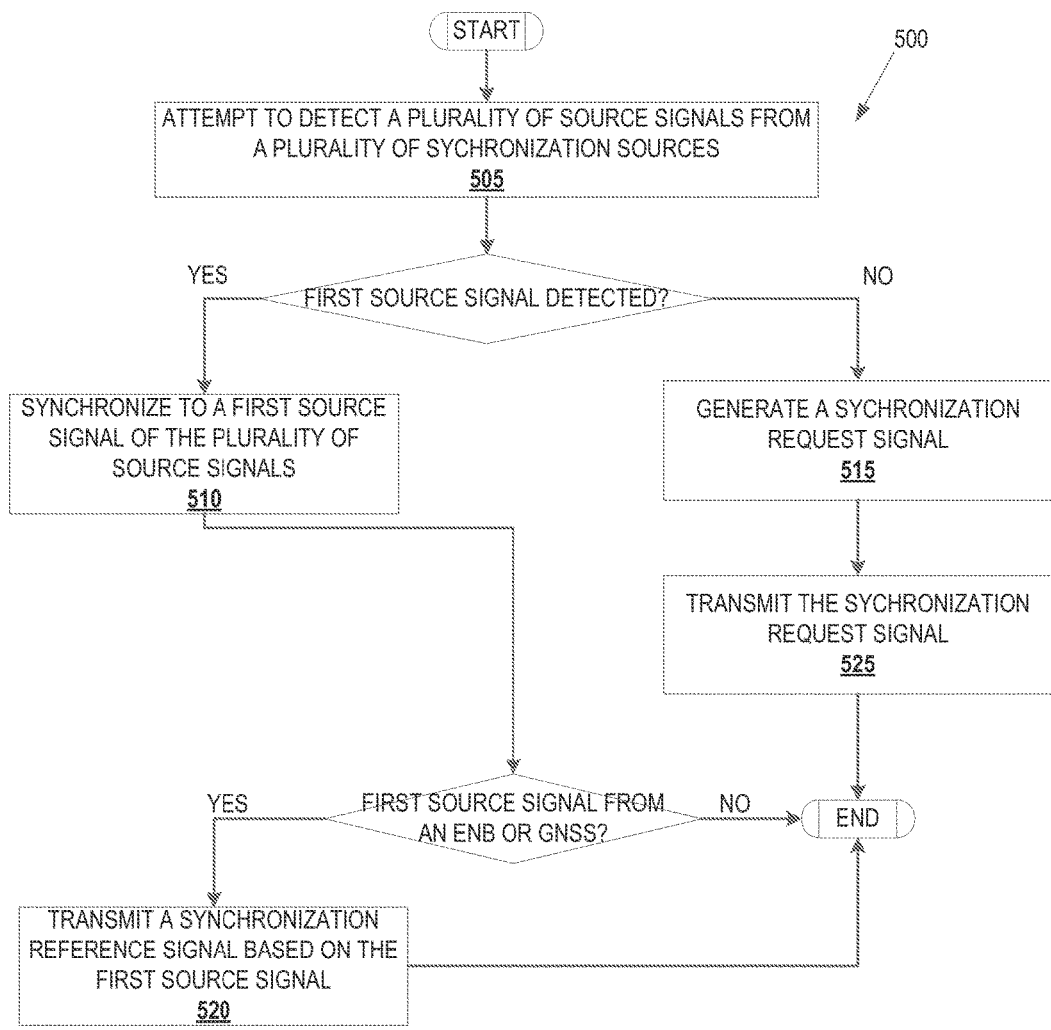
FIG. 5 is a flow diagram illustrating a method for receiving and transmitting signals associated with synchronization, in accordance with various embodiments.

With respect to FIG. 5, a flow diagram is shown illustrating a method 500 for synchronizing to a signal, in accordance with some embodiments. The method 500 may be performed by one or both UEs 105, 110 of FIG. 1, one or both UEs 205, 210 of FIG. 2, one or both UEs 305, 310 of FIG. 3, and/or an apparatus following the state machine of FIG. 4. While FIG. 5 illustrates a plurality of sequential operations, one of ordinary skill would understand that one or more operations of the method 500 may be transposed and/or performed contemporaneously.

The method 500 may begin with a first operation 505 of attempting to detect a plurality of source signals from a plurality of synchronization sources. In one embodiment, attempting to detect a plurality of source signals comprises passively scanning a radio spectrum that includes a first spectrum associated with an MNO and a second spectrum associated with public safety. A synchronization source of the plurality may be, for example, an eNB, a GNSS, or another UE (e.g., a public safety UE). According to the synchronization source, a source signal may be, for example, a PSS/SSS transmitted by an eNB, a signal transmitted by a GNSS, a signal from an eNB or GNSS relayed from another UE, or a synchronization request signal that operates as a synchronization reference signal from another UE. Various signals of the plurality may be received on different radio spectrums based on the synchronization source—for example, a PSS/SSS from an eNB may be transmitted on a radio spectrum associated with an MNO, whereas a signal related by another UE may be transmitted on a radio spectrum associated with public safety.

Where a first source signal is detected, the method 500 may proceed to an operation 510 of synchronizing to the first source signal. Where the first source signal is from an eNB or a GNSS, the method 500 may advance to operation 520 for transmitting a synchronization reference signal based on the first source signal. In one embodiment, the synchronization reference signal is transmitted in response to a synchronization request signal received from an obstructed UE. In various embodiments, the synchronization reference signal may be generated to include additional information, such as a number of hops from the synchronization source (e.g., the eNB or GNSS) or a priority associated with the synchronization reference signal. According to one embodiment, the synchronization reference signal may be transmitted on a spectrum associated with public safety (even if the first source signal is received on a spectrum that is not associated with public safety, such as a spectrum associated with an MNO).

Where a first source signal is not detected, the method 500 may proceed to an operation 515 of generating a synchronization request signal. Accordingly, the operation 525 may include transmitting the synchronization reference signal. According to one embodiment, the synchronization request signal may be transmitted on a spectrum associated with public safety.

Figure 6:
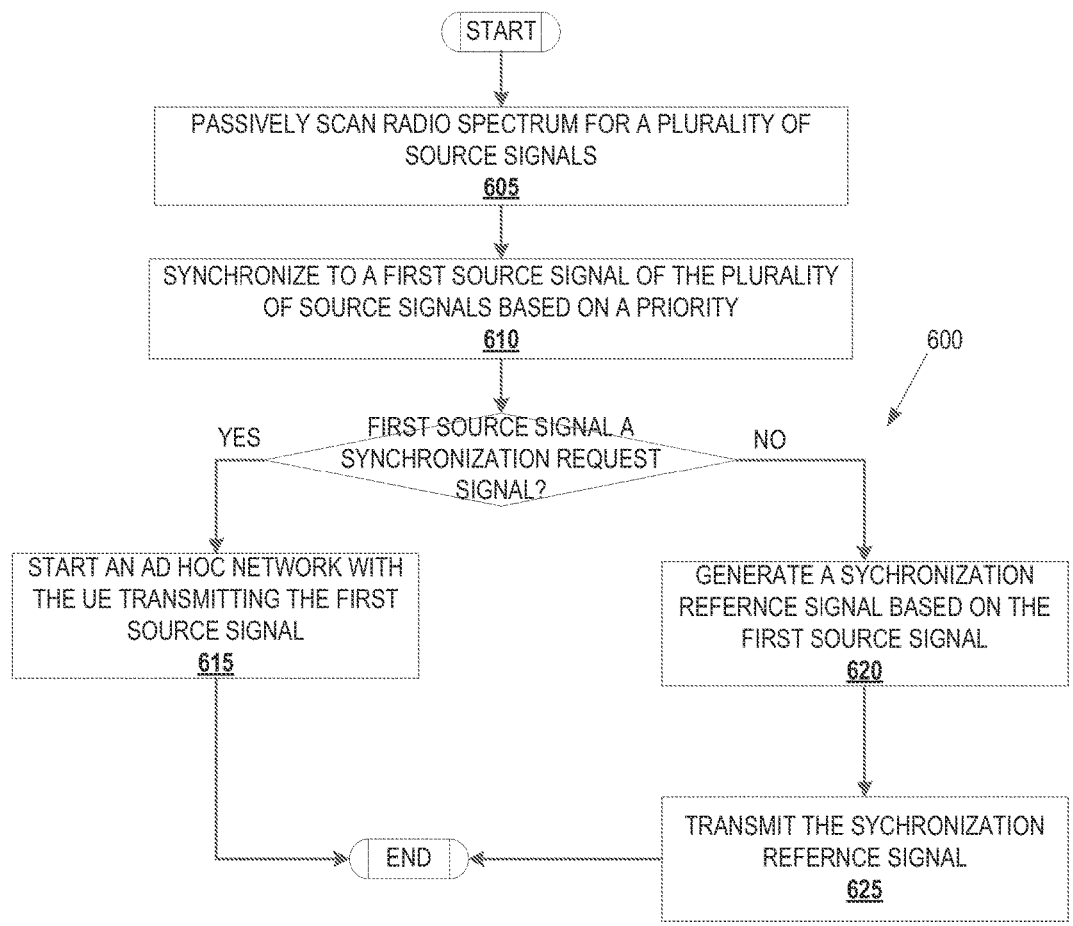
FIG. 6 is a flow diagram illustrating a method for receiving and transmitting signals associated with synchronization, in accordance with various embodiments.

Turning now to FIG. 6, a flow diagram is shown illustrating a method 600 for synchronizing to a signal, in accordance with some embodiments. The method 600 may be performed by one or both UEs 105, 110 of FIG. 1, one or both UEs 205, 210 of FIG. 2, one or both UEs 305, 310 of FIG. 3, and/or an apparatus following the state machine of FIG. 4. While FIG. 6 illustrates a plurality of sequential operations, one of ordinary skill would understand that one or more operations of the method 600 may be transposed and/or performed contemporaneously.

The method 600 may begin with a first operation 605 passively scanning a radio spectrum for a plurality of source signals. The radio spectrum may include a first spectrum associated with an MNO and a second spectrum associated with public safety. According to embodiments, the source signals may originate at a plurality of synchronization sources, which may include, for example, an eNB, a GNSS, or another UE (e.g., a public safety UE). According to the synchronization source, a source signal may be, for example, a PSS/SSS transmitted by an eNB, a signal transmitted by a GNSS, a signal from an eNB or GNSS relayed from another UE, or a synchronization request signal that operates as a synchronization reference signal from another UE. Various signals of the plurality may be received on different radio spectrums based on the synchronization source—for example, a PSS/SSS from an eNB may be transmitted on a radio spectrum associated with an MNO, whereas a signal related by another UE may be transmitted on a radio spectrum associated with public safety.

Where a first source signal is detected through the passive scanning of the radio spectrum, the method 600 may proceed to an operation 610 of synchronizing to the first source signal. In various embodiments, synchronizing to the first source signal may be based on a priority associated with the first source signal. For example, a plurality of priorities that are each assigned to a respective synchronization source may be stored in a UE and where a plurality of signals are detected through the passive scanning, the UE may synchronize to the signal having the highest stored priority. In another embodiment, the priority may be included as information in the source signal. In even another embodiment, the priority may be resolved from information included in the source signal or associated with the synchronization source, such as a number of hops.

According to one embodiment, the operation 605 of passively scanning the radio spectrum may be perpetually performed. Therefore, as other signals having higher priorities are detected, the operation 610 of synchronizing to a source signal based on a priority may be revisited so that a new source signal may be synchronized to. For example, a signal from a GNSS may be first detected and synchronized to. Subsequently, a signal from an eNB, having a higher priority than the GNSS signal may be detected. The signal from the eNB would then be used for synchronization, as opposed to the GNSS signal.

Where the first source signal is a synchronization request signal, such as a synchronization request signal received from a synchronization source that is a UE, the method 600 may advance to operation 615 for starting an ad hoc network with the UE synchronization source (i.e., the UE that transmitted the synchronization request signal). Accordingly, a distributed D2D ad hoc network may be synchronized and/or proximity-based services may be available with the UE synchronization source.

Where the first source signal is not a synchronization request signal, such as a signal received from a synchronization source that is an eNB or GNSS, the method 600 may advance to operation 620 for generating a synchronization reference signal based on the first source signal. In connection with generating a synchronization reference signal, operation 625 comprises transmitting the synchronization reference signal. In various embodiments, the synchronization reference signal may be generated to include additional information, such as a number of hops from the synchronization source (e.g., the eNB or GNSS) or a priority associated with the synchronization reference signal. According to one embodiment, the synchronization reference signal may be transmitted on a spectrum associated with public safety (even if the first source signal is received on a spectrum that is not associated with public safety, such as a spectrum associated with an MNO).

Figure 7:
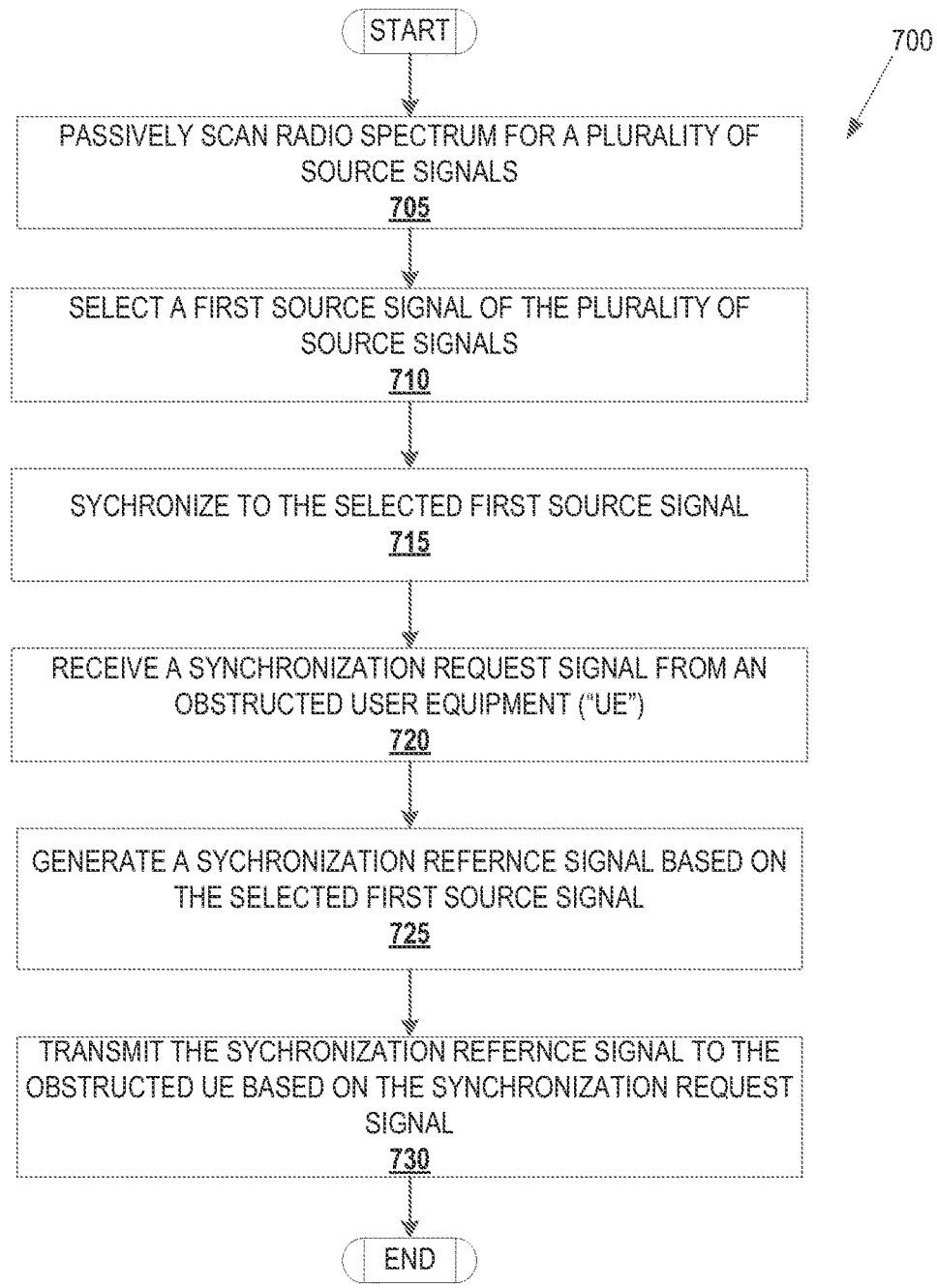
FIG. 7 is a flow diagram illustrating a method for receiving and transmitting signals associated with synchronization, in accordance with various embodiments.

With respect to FIG. 7, a flow diagram is shown illustrating a method 700 for synchronizing to a signal, in accordance with some embodiments. The method 700 may be performed by one or both UEs 105, 110 of FIG. 1, one or both UEs 205, 210 of FIG. 2, one or both UEs 305, 310 of FIG. 3, and/or an apparatus following the state machine of FIG. 4. While FIG. 7 illustrates a plurality of sequential operations, one of ordinary skill would understand that one or more operations of the method 700 may be transposed and/or performed contemporaneously.

The method 700 may begin with a first operation 705 passively scanning a radio spectrum for a plurality of source signals. The radio spectrum may include a first spectrum associated with an MNO and a second spectrum associated with public safety. According to embodiments, the source signals may originate at a plurality of synchronization sources, which may include, for example, an eNB, a GNSS, or another UE (e.g., a public safety UE). According to the synchronization source, a source signal may be, for example, a PSS/SSS transmitted by an eNB, a signal transmitted by a GNSS, a signal from an eNB or GNSS relayed from another UE, or a synchronization request signal that operates as a synchronization reference signal from another UE. Various signals of the plurality may be received on different radio spectrums based on the synchronization source—for example, a PSS/SSS from an eNB may be transmitted on a radio spectrum associated with an MNO, whereas a signal related by another UE may be transmitted on a radio spectrum associated with public safety.

In connection with the passive scanning of the radio spectrum, the method 700 may proceed to an operation 710 of selecting a first source signal. In various embodiments, selecting the first source signal may be based on a priority associated with the first source signal. For example, a plurality of priorities that are each assigned to a respective synchronization source may be stored in a UE and where a plurality of signals are detected through the passive scanning, the UE may synchronize to the signal having the highest stored priority. In another embodiment, the priority may be included as information in the source signal. In even another embodiment, the priority may be resolved from information included in the source signal or associated with the synchronization source, such as a number of hops. With the first source signal selected, operation 715 comprises synchronizing to the selected first source signal.

The method 700 may additionally include an operation 720 for receiving a synchronization request signal from an obstructed UE. In connection with the synchronization request signal, operation 725 may comprise generating a synchronization reference signal. The synchronization reference signal may be generated based on the selected first source signal—e.g., the synchronization reference signal may be generated to relay the selected first source signal for synchronization. In various embodiments, the synchronization reference signal may be generated to include additional information, such as a number of hops from the synchronization source (e.g., the eNB or GNSS) or a priority associated with the synchronization reference signal. According to one embodiment, the synchronization reference signal may be transmitted on a spectrum associated with public safety (even if the first source signal is received on a spectrum that is not associated with public safety, such as a spectrum associated with an MNO). Accordingly, the method 700 may include an operation 730 for transmitting the synchronization reference signal to the obstructed UE based on the synchronization request signal (e.g., in response to the synchronization request signal).

Figure 8:
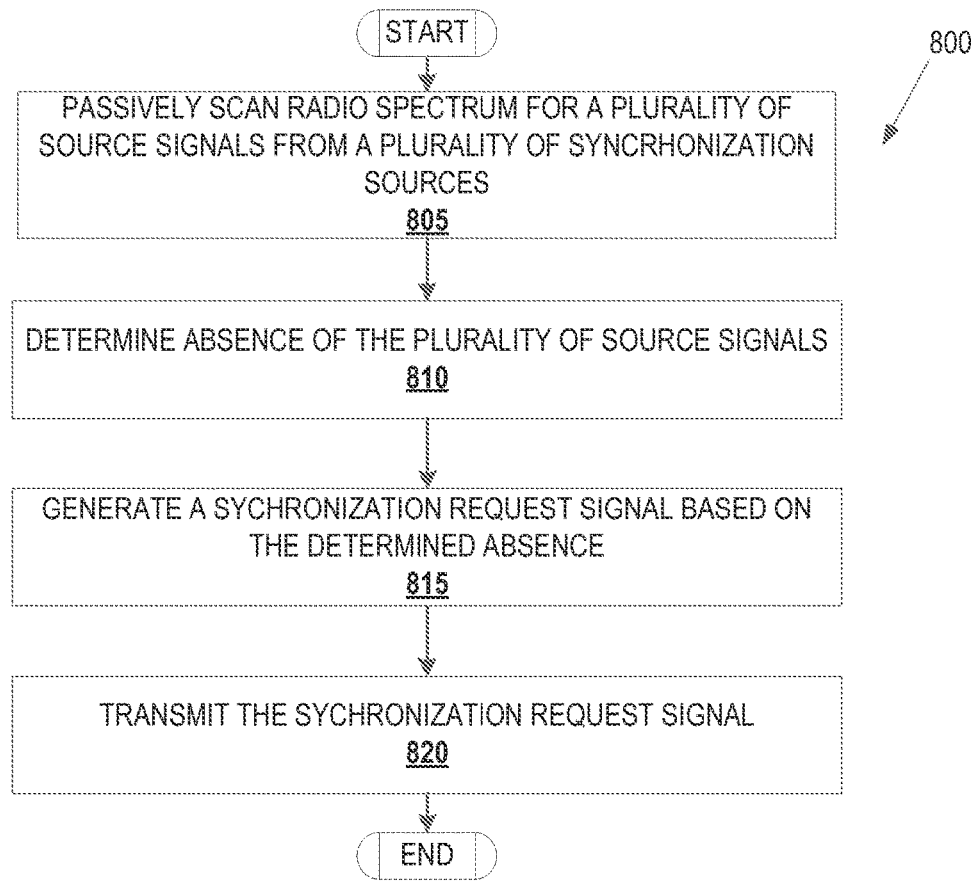
FIG. 8 is a flow diagram illustrating a method for receiving and transmitting signals associated with synchronization, in accordance with various embodiments.

In reference to FIG. 8, a flow diagram is shown illustrating a method 800 for transmitting a synchronization request signal, in accordance with some embodiments. The method 800 may be performed by one or both UEs 105, 110 of FIG. 1, one or both UEs 205, 210 of FIG. 2, one or both UEs 305, 310 of FIG. 3, and/or an apparatus following the state machine of FIG. 4. While FIG. 8 illustrates a plurality of sequential operations, one of ordinary skill would understand that one or more operations of the method 800 may be transposed and/or performed contemporaneously.

The method 800 may begin with a first operation 805 passively scanning a radio spectrum for a plurality of source signals. The radio spectrum may include a first spectrum associated with an MNO and a second spectrum associated with public safety. According to embodiments, the source signals may originate at a plurality of synchronization sources, which may include, for example, an eNB, a GNSS, or may be relayed from an eNB or GNSS by another UE. According to the synchronization source, a source signal may be, for example, a PSS/SSS transmitted by an eNB, a signal transmitted by a GNSS, a signal from an eNB or GNSS relayed from another UE, or a synchronization request signal that operates as a synchronization reference signal from another UE.

The method 800 may include an operation 810 of determining the absence of the plurality of source signals. In various embodiments, this operation 810 indicates the absence of a signal from an outside source (e.g., an eNB or GNSS) that is suitable for synchronization. In one embodiment, operation 810 includes operations for beginning a countdown timer based on the determined absence of the plurality of source signals. At the expiry of this countdown timer, operation 805 may be revisited such that the radio spectrum is again passively scanned.

Based on the determined absence of the plurality of source signals, the method 800 may advance to operation 815 for generating a synchronization request signal. In various embodiments, one or more synchronization request signals may be received that are not from an outside synchronization source (e.g., an eNB or GNSS), and the synchronization request signal may be generated based on an average of the frequencies and an average of the symbol boundaries of the one or more received synchronization request signals. Accordingly, an ad hoc network can be synchronized with one or more UEs that transmitted the one or more synchronization request signals. In connection with generating a synchronization request signal, operation 820 comprises transmitting the synchronization request signal. In various embodiments, the synchronization request signal may be transmitted on a spectrum associated with public safety. According to one embodiment, operation 820 is performed at the expiry of the countdown timer initiated at operation 810.

Figure 9:
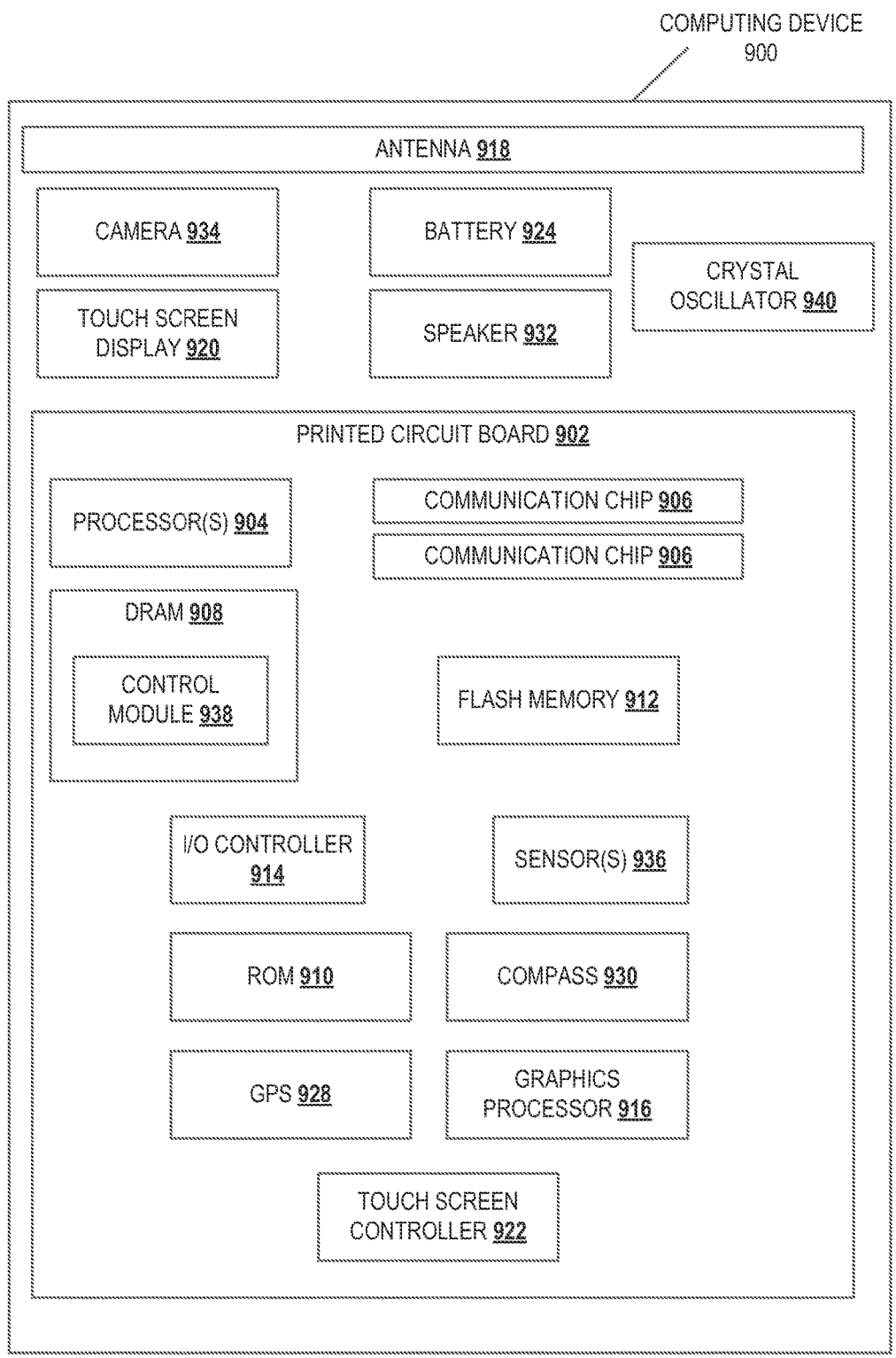
FIG. 9 is a block diagram of a computing device adapted to operate in a wireless communication network, in accordance to various embodiments.

With respect to FIG. 9, a block diagram illustrates an example computing device 900, in accordance with various embodiments. The UEs 105, 110 of FIG. 1, the UEs 205, 210 of FIG. 2, the UEs 305, 310 of FIG. 3, and/or the state machine of FIG. 4 and described herein may be implemented on a computing device such as computing device 900. The computing device 900 may include a number of components, one or more processor 904 and at least one communication chips 906. Depending upon the embodiment, one or more of the enumerated components may comprise "circuitry" of the computing device 900, such as processing circuitry, communications circuitry, and the like. In various embodiments, the one or more processor(s) 904 each may be a processor core. In various embodiments, the at least one communication chips 906 may be physically and electrically coupled with the one or more processor(s) 904. In further implementations, the communication chips 906 may be part of the one or more processor(s) 904. In various embodiments, the computing device 900 may include a printed circuit board ("PCB") 902. For these embodiments, the one or more processors 904 and communication chip 906 may be disposed thereon. In alternate embodiments, the various components may be coupled without the employment of the PCB 902.

Depending upon its applications, the computing device 900 may include other components that may or may not be physically and electrically coupled with the PCB 902. These other components include, but are not limited to, volatile memory (e.g., dynamic random access memory 908, also referred to as "DRAM"), non-volatile memory (e.g., read only memory 910, also referred to as "ROM"), flash memory 912, an input/output controller 914, a digital signal processor (not shown), a crypto processor (not shown), a graphics processor 916, one or more antenna(s) 918, a display (not shown), a touch screen display 920, a touch screen controller 922, a battery 924, an audio codec (not shown), a video code (not shown), a global positioning system ("GPS") or other satellite navigation device 928, a compass 930, an accelerometer (not shown), a gyroscope (not shown), a speaker 932, a camera 934, one or more sensors 936 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the processor 904 may be integrated on the same die with other components to form a system on a chip ("SOC").

In various embodiments, volatile memory (e.g., DRAM 908), non-volatile memory (e.g., ROM 910), flash memory 912, and the mass storage device (not shown) may include programming instructions configured to enable the computing device 900, in response to the execution by one or more processors 904, to practice all or selected aspects of the data exchanges and methods described herein, depending on the embodiment of the computing device 900 used to implement such data exchanges and methods. More specifically, one or more of the memory components (e.g., DRAM 908, ROM 910, flash memory 912, and the mass storage device) may include temporal and/or persistent copies of instructions that, when executed by one or more processors 904, enable the computing device 900 to operate one or more modules 938 configured to practice all or selected aspects of the data exchanges and method described herein, depending on the embodiment of the computing device 900 used to implement such data exchanges and methods.

The communication chips 906 may enable wired and/or wireless communications for the transfer of data to and from the computing device 900. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 906 may implement any of a number of wireless standards or protocols, including but not limited to Long Term Evolution ("LTE"), LTE Advanced ("LTE-A"), Institute of Electrical and Electronics Engineers ("IEEE") 902.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 900 may include a plurality of communication chips 906 adapted to perform different communication functions. For example, a first communication chip 906 may be dedicated to shorter range wireless communications, such as Wi-Fi and Bluetooth, whereas a second communication chip 906 may be dedicated to longer range wireless communications, such as GPS, EDGE, GPRS, CDMA, WiMAX, LTE, LTE-A, Ev-DO, and the like.

In various embodiments, the computing device 900 may include a crystal oscillator 940. The crystal oscillator 940 may be communicatively coupled with the communication chip(s) 906 and/or other communications circuitry. The crystal oscillator may use mechanical resonance of vibrating crystal (e.g., of piezoelectric material) to create an electrical signal with a very precise frequency. Thus, the crystal oscillator 940 may be used to generate signals that are transmitted by a UE.

In various implementations, the computing device 900 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 900 may be another other electronic device that processes data.

In various embodiments, example 1 may be an apparatus to be included in a UE comprising processing circuitry and communications circuitry communicatively coupled with the processing circuitry. The processing circuitry may be adapted to attempt to detect a plurality of source signals from a plurality of synchronization sources, to synchronize to a first source signal of the plurality of source signals where the first source signal is detected, and to generate a first synchronization request signal where the plurality of source signals is not detected. The communications circuitry may be adapted to transmit the first synchronization request signal where the first synchronization request signal is generated, and to transmit a synchronization reference signal where the processing circuitry synchronizes to the first source signal and the synchronization source is an eNB or a GNSS. Example 2 may include the apparatus of example 1, wherein the communications circuitry is to transmit the first synchronization request signal and the synchronization reference signal on a spectrum associated with public safety. Example 3 may include the apparatus of example 1 or 2, wherein the plurality of synchronization sources includes a second UE associated with public safety. Example 4 may include the apparatus of examples 1 or 2, wherein the UE in which the apparatus is to be included is a public safety device. Example 5 may include the apparatus of example 1 or 2, wherein the processing circuitry is further to generate the synchronization reference signal based on the detected first source signal. Example 6 may include the apparatus of example 1 or 2, wherein the communications circuitry is to transmit the synchronization reference signal based on a second synchronization request signal, the communications circuitry is further to receive the second synchronization request signal from an obstructed UE. Example 7 may include the apparatus of example 1 or 2, wherein the processing circuitry is to attempt to detect the plurality of signals by passively scanning a radio spectrum. Example 8 may include the apparatus of example 7, wherein the radio spectrum includes a first spectrum associated with a mobile network operator and a second spectrum associated with public safety.

In various embodiments, example 9 may be an apparatus to be included in a UE, the apparatus comprising processing circuitry and communications circuitry communicatively coupled with the processing circuitry. The processing circuitry may be adapted to synchronize to a first source signal of a plurality of source signals based on a first priority associated with the first source signal, each source signal of the plurality of source signals to be associated with a respective synchronization source, and to start an ad hoc network where the first source signal is a synchronization request signal associated with a UE synchronization source. The communications circuitry may be adapted to passively scan a radio spectrum for the plurality of source signals, to receive the first source signal, and to transmit a synchronization reference signal where the synchronization source associated with the first source signal is not the UE synchronization source. Example 10 may include the apparatus of claim 9, wherein the communications circuitry is further to continue to scan the radio spectrum for the plurality of source signals after the processing circuitry has synchronized to the first source signal, and to receive a second source signal associated with a higher priority than the first source signal, and further wherein the processing circuitry is further to synchronize to the received second source signal, instead of the first source signal, based on the higher priority associated with the received second source signal. Example 11 may include the apparatus of example 10, wherein the processing circuitry is further to determine the first priority of the first source signal and the higher priority of the second source signal based on respective synchronization sources associated with the first and second source signals. Example 12 may include the apparatus of any of examples 9 through 11, wherein the communications circuitry is to receive the synchronization request signal on a first spectrum associated with public safety. Example 13 may include the apparatus of any of examples 9 through 11, wherein the communications circuitry is to transmit the synchronization reference signal on a first spectrum associated with public safety. Example 14 may include the apparatus of any of examples 9 through 11, wherein a first respective synchronization source associated with the first source signal is a GNSS or an eNB. Example 15 may include the apparatus of any of examples 10 through 11, wherein a first respective synchronization source associated with the first source signal is a GNSS and a second respective synchronization source associated with the second source signal is an eNB.

In various embodiments, example 16 may be a computer-implemented method to be performed in a UE, the method comprising operations for passively scanning a radio spectrum to detect a plurality of source signals; selecting a first source signal of the plurality of source signals that is detected from the passively scanning; synchronizing to the selected first source signal; receiving a synchronization request signal from a geographically proximate UE; generating a synchronization reference signal based on the selected first source signal; and transmitting the synchronization reference signal to the geographically proximate UE based on the synchronization request signal. Example 17 may include the method of example 16, wherein the first source signal is from a GNSS or an eNB. Example 18 may include the method of example 16 or the method of example 17, wherein the first source signal is detected on a first spectrum of the radio spectrum that is associated with a mobile network operator and further wherein the transmitting the synchronization reference signal comprises: transmitting, on a second spectrum associated with public safety, the synchronization reference signal to the geographically proximate UE based on the synchronization request signal. Example 19 may include the method of example 16 or the method of example 17, wherein the geographically proximate UE is a public safety device adapted for proximity-based services.

In various embodiments, example 20 may be one or more non-transitory computing device-readable media comprising computing device-executable instructions to be included in a UE. In response to execution by computing device, the instructions may cause the computing device to scan a radio spectrum for a plurality of source signals from a plurality of synchronization sources; determine that the plurality of source signals is absent based on the scan of the radio spectrum; generate a first synchronization request signal to be associated with an ad hoc network based on the determined absence; and transmit the generated first synchronization request signal. Example 21 may include the one or more non-transitory computing device-readable media of example 20, wherein the instructions are to cause the computing device to generate the first synchronization request signal based additionally on an average of frequencies and an average of symbol boundaries of a plurality of received synchronization request signals such that the ad hoc network can be synchronized, and further wherein the instructions are further to cause the computing device to receive the plurality of synchronization request signals from a plurality of obstructed UEs. Example 22 may include the one or more non-transitory computing device-readable media of example 20 or example 21, wherein the instructions are to cause the computing device to transmit the generated first synchronization request signal on a first spectrum that is associated with public safety. Example 23 may include the one or more non-transitory computing device-readable media of example 20 or example 21, wherein the UE in which the computing device-executable instructions are to be included is a public safety device adapted for proximity-based services. Example 24 may include the one or more non-transitory computing device-readable media of example 20 or example 21, wherein the instructions are to cause the computing device to transmit the first synchronization request signal before expiry of a countdown timer and to passively scan the radio spectrum at expiry of the countdown timer, and further wherein the instructions are further to cause the computing device to begin a countdown timer based on the determined absence of the plurality of source signals. Example 25 may include the one or more non-transitory computing device-readable media of example 24, wherein the instructions are to cause the computing device to repeatedly begin the countdown timer such that the computing device passively scans the radio spectrum at expiry of the countdown timer until at least one source signal of the plurality of source signals is not absent.

In various embodiments, example 26 may be computer-implemented, the method comprising: attempting to detect a plurality of source signals from a plurality of synchronization sources; synchronizing to a first source signal of the plurality of source signals where the first source signal is detected; generating a first synchronization request signal where the plurality of source signals is not detected; transmitting the first synchronization request signal where the first synchronization request signal is generated; and transmitting a synchronization reference signal where the processing circuitry synchronizes to the first source signal and the synchronization source is an evolved Node B ("eNB") or a global navigation satellite system ("GNSS"). Example 27 includes the computer-implemented method of example 26, wherein the first synchronization request signal and the synchronization reference signal are to be transmitted on a spectrum associated with public safety. Example 28 includes the computer-implemented method of any of examples 26-27, wherein the plurality of synchronization sources includes a second UE associated with public safety. Example 29 includes the computer-implemented method of any of examples 26-27, the method further comprising: generating the synchronization reference signal based on the detected first source signal. Example 30 includes the computer-implemented method of any of examples 26-27, wherein the synchronization reference signal is to be transmitted based on a second synchronization request signal, and the method further comprising: receiving the second synchronization request signal from an obstructed UE. Example 31 includes the computer-implemented method of any of examples 26-27, wherein the attempting to detect the plurality of signals comprises: passively scanning a radio spectrum for at least one of the plurality of source signals from the plurality of synchronization sources.

In various embodiments, example 32 may be one or more non-transitory computing device-readable media comprising computing device-executable instructions to be included in a user equipment ("UE"), wherein the instructions, in response to execution by a computing device, cause the computing device to: passively scan a radio spectrum for a plurality of source signals, each source signal of the plurality of source signals to be associated with a respective synchronization source; receive a first source signal of the plurality of source signals; synchronize to the received first source signal of the plurality of source signals based on a first priority associated with the first source signal; start an ad hoc network where the first source signal is a synchronization request signal associated with a UE synchronization source; and transmit a synchronization reference signal where the synchronization source associated with the first source signal is not the UE synchronization source. Example 33 may include the one or more non-transitory computing device-readable media of example 32, wherein the synchronization request signal is to be received on a first spectrum associated with public safety. Example 34 may include the one or more non-transitory computing device-readable media of any of examples 32-33, wherein the synchronization reference signal is to be transmitted on a first spectrum associated with public safety. Example 35 may include the one or more non-transitory computing device-readable media of any of examples 32-33, wherein a first respective synchronization source associated with the first source signal is a global navigation satellite system or an evolved Node B.

Example 36 may be apparatus to be included in a user equipment ("UE"), the apparatus comprising: communications circuitry to passively scan a radio spectrum to detect a plurality of source signals, to receive a synchronization request signal from a geographically proximate UE; and to transmit a synchronization reference signal to the geographically proximate UE based on the synchronization request signal; and processing circuitry to select a first source signal of the plurality of source signals that is detected from the passively scanning, synchronize to the selected first source signal, and generate the synchronization reference signal based on the selected first source signal. Example 37 may include the apparatus of example 36, wherein the first source signal is from an evolved Node B or a global navigation satellite system. Example 38 may include the apparatus of any of examples 36-37, wherein the geographically proximate UE is a public safety device adapted for proximity-based services.

In various embodiments, example 39 may be a system to be included in a UE, the system comprising: at least one processor; and at least one memory having processor-executable instructions that, in response to execution by the at least one processor, cause the system to: scan a radio spectrum for a plurality of source signals from a plurality of synchronization sources; determine that the plurality of source signals is absent based on the scan of the radio spectrum; generate a first synchronization request signal to be associated with an ad hoc network based on the determined absence; and transmit the generated first synchronization request signal. Example 40 may include the system of example 39, wherein the instructions are to cause the computing device to transmit the generated first synchronization request signal on a first spectrum that is associated with public safety.

In various embodiments, example 41 may be an apparatus to be included a user equipment ("UE"), the apparatus comprising: means for scanning a radio spectrum for a plurality of source signals from a plurality of synchronization sources; means for determining that the plurality of source signals is absent based on the scan of the radio spectrum; means for generating a first synchronization request signal to be associated with an ad hoc network based on the determined absence; and means for transmitting the generated first synchronization request signal. Example 42 may include the apparatus of example 41, wherein the means for generating the first synchronization request signal to be associated with the ad hoc network based on the determined absence is based additionally on an average of frequencies and an average of symbol boundaries of a plurality of received synchronization request signals such that the ad hoc network can be synchronized, and the apparatus further comprising: means for receiving the plurality of synchronization request signals from a plurality of obstructed UEs. Example 43 may include the apparatus of any of examples 41-42, wherein the means for transmitting the generated first synchronization request signal is to transmit the generated first synchronization request signal on a first spectrum that is associated with public safety. Example 44 may include the apparatus of any of examples 41-42, wherein the UE in which the apparatus is to be included is a public safety device adapted for proximity-based services. Example 45 may include the apparatus of any of examples 41-42, wherein the means for transmitting the generated first synchronization request signal is to transmit the first synchronization request signal before expiry of a countdown timer and the means for scanning the radio spectrum for the plurality of source signals from the plurality of synchronization sources is to passively scan the radio spectrum at expiry of the countdown timer, and the apparatus further comprising: means for beginning a countdown timer based on the determined absence of the plurality of source signals. Example 46 may include the apparatus of example 45, wherein the means for beginning the countdown timer based on the determined absence of the plurality of source signals is to repeatedly begin the countdown timer such that the means for scanning the radio spectrum is to passively scan the radio spectrum at expiry of the countdown timer until at least one source signal of the plurality of source signals is not absent.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
   processing circuitry:
      to attempt to detect a plurality of source signals from a plurality of synchronization sources, to synchronize to a first source signal of the plurality of source signals where the first source signal is detected, and to generate a first synchronization request signal where the plurality of source signals is not detected; and communications circuitry, communicatively coupled with the processing circuitry, to transmit the first synchronization request signal where the first synchronization request signal is generated, wherein the first source signal is directly from an evolved Node B ("eNB") or forwarded from the eNB by another UE and the processing circuitry, upon detecting the first source signal and a second source signal from a global navigation satellite system ("GNSS"), is to synchronize with the first source signal based on a relatively higher priority associated with the eNB as compared to the GNSS.

2. The apparatus of claim 1, wherein the communications circuitry is to transmit the first synchronization request signal and a synchronization reference signal on a spectrum associated with public safety.

3. The apparatus of claim 1, wherein the plurality of synchronization sources includes a second UE associated with public safety.

4. The apparatus of claim 1, wherein the UE in which the apparatus is to be included is a public safety device.

5. The apparatus of claim 1, wherein the processing circuitry is to generate a synchronization reference signal if the first source signal is directly from the eNB, wherein the synchronization reference signal is not generated if the first source signal is forwarded by another UE.

6. The apparatus of claim 1, wherein the communications circuitry is to transmit a synchronization reference signal based on a second synchronization request signal, the communications circuitry is further to receive the second synchronization request signal from an obstructed UE.

7. The apparatus of claim 1, wherein the processing circuitry is to attempt to detect the plurality of source signals by passively scanning a radio spectrum.

8. The apparatus of claim 7, wherein the radio spectrum includes a first spectrum associated with a mobile network operator and a second spectrum associated with public safety.

9. An apparatus to be included in a user equipment ("UE"), the apparatus comprising:
    processing circuitry to synchronize to a first source signal of a plurality of source signals based on predetermined parameters, each source signal of the plurality of source signals to be associated with a respective synchronization source, and to start an ad hoc network where the first source signal is a synchronization request signal associated with a UE synchronization source; and
    communications circuitry, communicatively coupled with the processing circuitry, to passively scan a radio spectrum for the plurality of source signals, to receive the first source signal, and to transmit a synchronization reference signal where the synchronization source associated with the first source signal is not the UE synchronization source,
    wherein the predetermined parameters associate: a first priority with the first source signal; a second priority, which is less than the first priority, with a second source signal; and a third priority, which is less than the second priority, with a third source signal, wherein the first source signal is to be received directly from an evolved Node B ("eNB"), the second source signal is to be received directly from a public safety device that received a synchronization signal directly from an eNB, and the third source signal is to be received directly or indirectly from a global navigation satellite service ("GNSS").

10. The apparatus of claim 9,
wherein the communications circuitry is further to continue to scan the radio spectrum for the plurality of source signals after the processing circuitry has synchronized to the second or third source signals, and to receive the first source signal, and
further wherein the processing circuitry is further to synchronize to the received first source signal, instead of the second or third source signals, based on the first priority being higher than the second and third priorities.

11. The apparatus of claim 9, wherein the communications circuitry is to receive the synchronization request signal on a first spectrum associated with public safety.

12. The apparatus of claim 9, wherein the communications circuitry is to transmit the synchronization reference signal on a first spectrum associated with public safety.

13. A computer-implemented method to be performed in a user equipment ("UE"), the method comprising:
    passively scanning a radio spectrum to detect a plurality of source signals;
    detecting a first source signal received directly from an evolved Node B ("eNB") and a second source signal from a global navigation satellite system ("GNSS");
    selecting, based on a relatively higher priority associated with the eNB as compared to the GNSS, the first source signal of the plurality of source signals that is detected from the passively scanning;
    synchronizing to the selected first source signal;
    receiving a synchronization request signal from a geographically proximate UE;
    generating a synchronization reference signal based on the selected first source signal; and
    transmitting the synchronization reference signal to the geographically proximate UE based on the synchronization request signal.

14. The computer-implemented method of claim 13, wherein the first source signal is detected on a first spectrum of the radio spectrum that is associated with a mobile network operator and further wherein the transmitting the synchronization reference signal comprises:
    transmitting, on a second spectrum associated with public safety, the synchronization reference signal to the geographically proximate UE based on the synchronization request signal.

15. The computer-implemented method of claim 13, wherein the geographically proximate UE is a public safety device adapted for proximity-based services.

* * * * *